(12) United States Patent
De Vries

(10) Patent No.: US 8,435,365 B2
(45) Date of Patent: May 7, 2013

(54) LAMINATING DEVICE AND METHOD FOR LAMINATING

(75) Inventor: Ike Gerke De Vries, Kaatsheuvel (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 562 days.

(21) Appl. No.: 12/667,167

(22) PCT Filed: Aug. 22, 2008

(86) PCT No.: PCT/NL2008/050562
§ 371 (c)(1),
(2), (4) Date: Feb. 9, 2010

(87) PCT Pub. No.: WO2009/005356
PCT Pub. Date: Jan. 8, 2009

(65) Prior Publication Data
US 2011/0011519 A1    Jan. 20, 2011

(30) Foreign Application Priority Data
Jun. 29, 2007    (EP) .................................... 07111448

(51) Int. Cl.
*B32B 37/00*    (2006.01)
(52) U.S. Cl.
USPC ............. 156/64; 156/164; 156/229; 156/256; 156/324

(58) Field of Classification Search ............... 156/229, 156/163, 164, 324, 250, 64
See application file for complete search history.

(56) References Cited

U.S. PATENT DOCUMENTS 5,470,411 A    11/1995   Gloton et al.
5,569,879 A  * 10/1996   Gloton et al. ................. 361/782

FOREIGN PATENT DOCUMENTS
WO    WO 98/06576    2/1998

OTHER PUBLICATIONS
International Search Report dated Sep. 4, 2009, for PCT/NL2008/050562.

* cited by examiner

*Primary Examiner* — Jeff Aftergut
(74) *Attorney, Agent, or Firm* — Leydig, Voit & Mayer, Ltd.

(57) ABSTRACT

A method is described for providing a substrate foil (L0) with at least a laminating foil (L1) of material. The method comprises the steps of providing the substrate foil (L0) and the laminating foil (L1). And subsequently applying weakend portions (100) in the laminating foil (L1). The weakened portions extend in a direction transverse (Dtr) to a longitudinal direction of the laminating foil, and are spaced at intervals along the longitudinal direction. The weakened portions have a width (w) substantially smaller than the length (Δ) of said intervals, providing a tension to the laminating foil (L1) in the longitudinal direction (Dlong). Thereby the laminating foil (L1) is stretched in the weakened portions, attaching the stretched laminating foil (L1) to the substrate foil (L0).

8 Claims, 11 Drawing Sheets

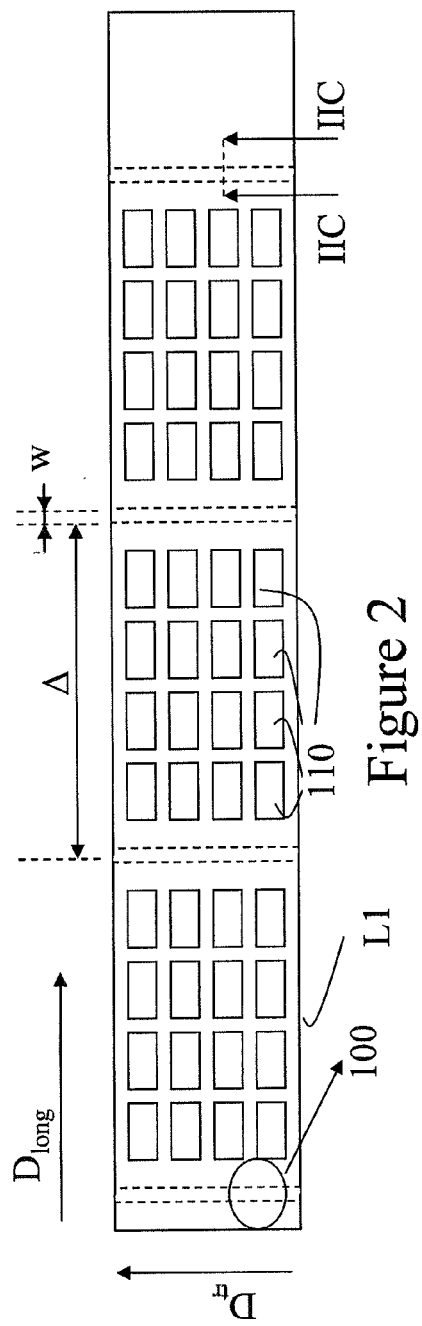
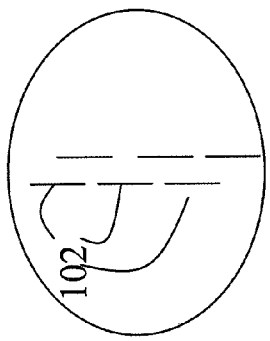
Figure 2C
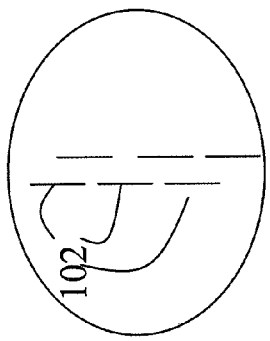
Figure 2D
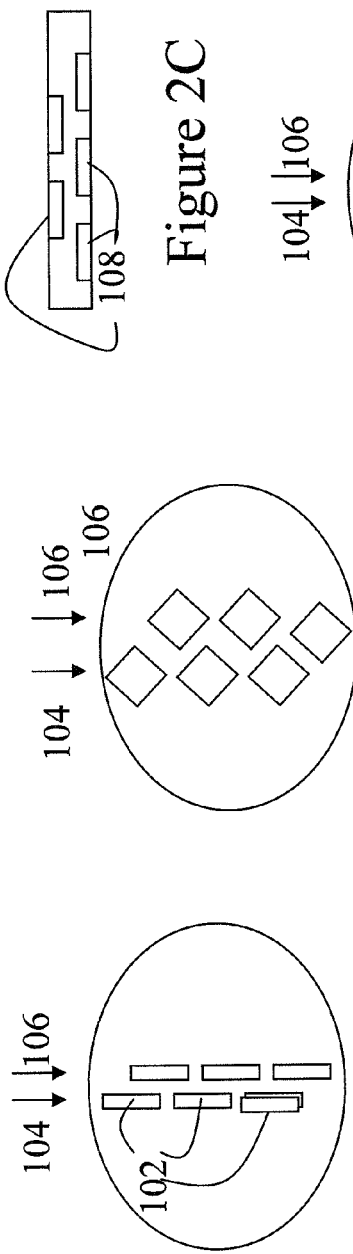
Figure 2B
Figure 2A

LAMINATING DEVICE AND METHOD FOR LAMINATING

BACKGROUND

Various products are fabricated by sequential addition of components to previously supplied components. An important application area is in the manufacturing of electronic components as a stack of foils. Subsequent foils in the stack have electronic functional areas that in contact with each other perform an electronic function. A first foil forms a substrate foil whereon a next foil, the laminating foil, is laminated, e.g. by gluing. In the manufacture of said electronic components it is important that mutually subsequent foils are accurately positioned with respect to each other in order that corresponding electronic features in the subsequent foils accurately contact each other.

It is desirable that the manufacturing process can take place in a continuous production line so as to keep production costs at a moderate level. When manufacturing electronic components as a stack of foils, this would necessitate supplying the foils from separate rolls in a longitudinal direction and attaching them to each other. However, the foils tend to stretch due to the force with which they are transported. The amount of stretching is difficult to predict, as it depends on various factors, such as the influence of the temperature of the environment on the foil, the variations in the elasticity of the foil, e.g. due to variations in the thickness of the foil. The amount of stretching further depends on the nature of the specific electronic structures applied in the foil, i.e. a density with which the structures are applied and a direction with which they are applied.

Even if initially the displacement is negligible, small deviations may accumulate to substantial displacements in the longitudinal direction between two subsequent foils. Moreover, even small foil deformations can result in residual stresses in the resulting product. These residual stresses have a negative influence on the performance and reliability of the product.

It is noted that WO 98/06576 describes a lamination device wherein a substrate foil and a laminating foil are mutually aligned. In the prior art document the motion of the foils is controlled by cogs at a roll that cooperate with perforations in the foils. By pulling and knocking the foils are realigned.

SUMMARY

Accordingly it is an object to provide a method and an apparatus that at least partially overcome these problems.

According to an aspect of the invention a Method for laminating a substrate foil with at least a laminating foil, comprising the steps of providing the substrate foil, providing the laminating foil, applying weakened portions in the laminating foil, the weakened portions extending in a direction transverse to a longitudinal direction of the laminating foil, said weakened portions being spaced at intervals along the longitudinal direction, and having a width substantially smaller than the length of said intervals, maintaining a tension to the laminating foil in the longitudinal direction, thereby stretching the laminating foil in the weakened portions, attaching the stretched laminating foil to the substrate foil, wherein the laminating foil and the substrate foil are allowed to move freely relatively to each other until attaching the laminating foil to the substrate foil to form a laminated foil, aligning the laminating foil with the substrate foil by measuring a longitudinal position of the laminating foil relative to the substrate foil, using said measurement by controlling the tension in the laminating foil dependent on said measured relative longitudinal position, and transporting the laminated foil by friction between the laminated foil and a transport facility.

The weakened portions in the laminating foil allow that foil to be stretched in its longitudinal direction, and therewith to prevent an accumulation of disalignments in that foil relative to the substrate foil. Additionally, the stretching allowed in the weakened portions minimizes the stress exerted to the functional areas in the laminating foil between the weakened portions, and therewith reduces the risk of negative consequences for performance and reliability. The position of laminating foil relative to the substrate foil can be controlled continuously as the laminated foil is transported by friction. After the substrate foil is laminated with the laminating foil, the combination of the first and the laminating foil can serve as a next substrate foil and the subsequent foil applied as a laminate on the substrate foil as a laminating foil. For the purpose of this description, the foil that is provided with weakened portions shall be denoted as the laminating foil and the other one as the substrate foil. If both foils are applied with weakened portions an arbitrary one shall be denoted as the laminating foil and the other one as the substrate foil. If a new foil is added to a stack of foils then it is most practical to add the weakened portions to the new foil. Accordingly in that case the new foil is the laminating foil and the stack of foils is the substrate foil.

The weakening of the laminating foil may be expressed as a percentage that indicates the relative strength of the foil after weakening as compared to the strength before weakening. The strength is expressed as the ratio of a force F applied and the amount of stretching (elastic or plastic) occurring in the material. Preferably the strength is reduced to between 10% and 50% of the original strength of the foil. If the reduction in strength is substantially smaller, e.g. to a remaining strength of 90% of the original value, then the stress in the functional areas between the weakened portions tends to remain too high. If the reduction of strength is substantially larger, e.g. to 1% of the original strength, the laminating foil becomes difficult to handle, and the risk exists that the foil tears in the weakened areas.

It is not relevant whether the weakened portions are applied directly before the process of stretching and attaching the laminating foil to the substrate foil or whether the material for the laminating foil is already provided as a foil of material having a longitudinal direction and having weakened portions extending in a direction transverse to the length direction, the weakened portions being spaced at intervals along said length direction, and having a width substantially smaller than the length of said intervals.

A required amount of tension may be calculated, taking into account circumstances as a temperature in the environment, and material characteristics. In a preferred embodiment a position of the laminating foil is measured and the tension applied in the longitudinal direction is dependent on a deviation between said position and a desired position. In this way the required amount of stretch in the weakened portions can be determined very accurately.

Alternatively, a position of the laminating foil is measured and the amount of weakening applied to the laminating foil is dependent on a deviation between said position and a desired position relative to the substrate foil. For example more or less material may be removed from the weakened regions depending on the nature of the deviation. In this way the tension in the laminating foil may be maintained at a level optimal for the manufacturing process and for the laminating foil.

In an embodiment the position in the laminating foil is measured using markings on the laminating foil and the substrate foil. Markings can be applied that facilitate detection of the position of the laminating foil relative to the substrate foil. Various methods are known in the art to provide such markings. Instead of applying separate markings position detection may be based on features already present in the foils for other purposes, e.g. patterns formed by electronic circuitry present in the foils.

The laminating foil may be weakened in various ways, for example by thinning the foil, or by locally weakening the foil by a chemical reaction. In an embodiment the weakened portions in the laminating foil are perforations in the foil. In this way the amount of weakening can be determined very accurately.

In an embodiment the laminating foil comprises a first, continuous, layer that is relatively elastic, i.e. that has a low Young modulus and a second, interrupted layer that is relatively inelastic, i.e. that has a relatively high Young modulus. The laminating foil comprising this combination of layers can be achieved by co-extrusion, lamination and the like. The interruptions in the second layer may be applied by laser cutting, or knife cutting for example. Those portions of the laminating foil where the second layer is interrupted form weakened portions. The first layer may be relatively elastic with respect to the second layer in that it has a smaller thickness. Alternatively, or in addition the first layer may be constructed of a material that is intrinsically more elastic that the material of the second layer. Polyethylene therephtalate (PET) and polyethylene naphtalate (PEN) are examples of suitable materials having a high Young modulus. Suitable materials having a low Young modulus are for example polyethylene (PE) metallocene, and ethylene derivates, such as ethylene vinyl acetate (EVA) and ethylene methyl acrylate (EMA).

In another embodiment the weakened portions in the laminating foil are applied by thermally softening the foil. For this purpose the foil may be locally heated for example by radiation with a laser, or by contacting the foil with a heated rod. Depending on the nature of the material applied for the foil the portions may be permanently or temporarily weakened. The weakening may be caused by a change of the elastic properties due the heating, or by a plastic deformation, e.g. caused by a phase transition during the heating. It is sufficient that the portions remain weakened as long as a stress is applied on the foil.

In an embodiment the perforations are applied as at least a first and a second series of perforations applied in the direction transverse to the longitudinal direction, and wherein the second series is transversely displaced relative the second series. This embodiment has the advantage that it allows for an elastic deformation. The way in which the remaining material is patterned allows for a harmonica like deformation.

According to a further aspect of the invention an apparatus for providing a substrate foil with at least a laminating foil of material, comprises
 a first facility for guiding the substrate foil in a longitudinal direction of the substrate foil,
 a second facility for guiding the laminating foil in a longitudinal direction of the laminating foil, weakened portions being applied in the laminating foil, the weakened portions extending in a direction transverse to the longitudinal direction of the laminating foil, said weakened portions being spaced at intervals along the longitudinal direction, and having a width substantially smaller than the length of said intervals,
 a facility for maintaining a tension to the laminating foil in the longitudinal direction, thereby stretching the laminating foil in the weakened portions,
 a facility for attaching the stretched laminating foil to the substrate foil in order to form a laminated foil,
 a facility for controlling a position of the laminating foil relative to the substrate foil, comprising a facility for measuring a position of the laminating foil relative to the substrate foil, and a facility for aligning the laminating foil with the substrate foil by controlling the tension using said measurement,
 a facility for transporting the laminated foil by friction, and allowing the laminating foil and the substrate foil to move freely relatively to each other until attaching.

The tension in the laminating foil may be controlled by one or more actuators, i.e. electro-mechanical convertor elements such as a motor, e.g. a rotational motor. The actuators may be used actively, by driving an element, such as a guiding roll, or passively, by braking a roll.

A control facility for controlling the actuators may comprise dedicated hardware, or a programmed general purpose processor, or a combination thereof.

BRIEF DESCRIPTION OF THE DRAWINGS

FIG. 2 shows a laminating foil according to the invention, FIG. 2A shows a detail of the laminating foil of FIG. 2, FIG. 2B shows a detail of a first alternative embodiment of a laminating foil according to the invention, FIG. 2C shows a detail of a second alternative embodiment of a laminating foil according to the invention, FIG. 2D shows a detail of a third alternative embodiment of a laminating foil according to the invention, FIG. 3 schematically illustrates a second embodiment of an apparatus according to the invention.

DETAILED DESCRIPTION OF EMBODIMENTS

Figure 1:
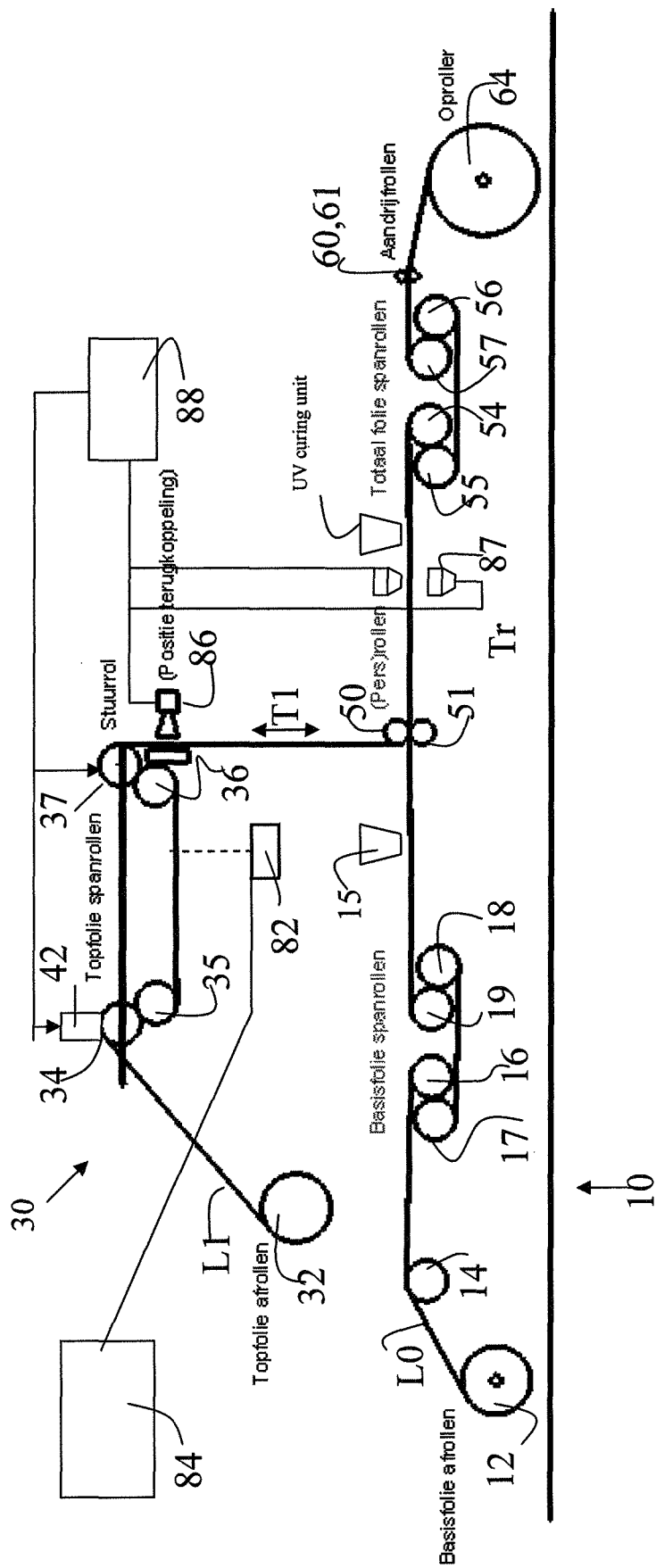
FIG. 1 schematically illustrates a first embodiment of an apparatus according to the invention.

FIG. 1 schematically illustrates an apparatus for providing a substrate foil L0 with at least a laminating foil L1. The apparatus comprises a first facility 10 for guiding the substrate foil L0. In the embodiment shown the first facility comprises a first supply roll 12 that is unrolled to supply the substrate foil L0. The unrolled substrate foil is guided along an idler roll 14 to a first and a second pair of S-wrap rolls 16, 17 and 18, 19 respectively, of which roll 17 is driven by a motor (not shown). Idler roll 14 gives the substrate foil L0 a predetermined angle with respect to the S-wrap rolls 16-19. The foil L0 is guided via the rolls 16-19 to a glue dispensing unit 15 for applying a glue to the foil L0.

The apparatus comprises a second facility 30 for guiding the laminating foil L1. The second facility 30 includes a second supply roll 32 that is unrolled to supply the laminating foil L1 of material. From the second supply roll 32 the laminating foil L1 is supplied to a third and a fourth pair of S-wrap rolls 34,35 and 36, 37 respectively. The roll 34 in the pairs of S-wrap rolls is driven by an actuator, motor 42 to control the tension in the foil. Roll 37 is a lateral guiding roll which is controllably displaceable in a direction transverse to the longitudinal direction to position the laminating foil L1 relative to the substrate foil in said transverse direction.

Subsequently the laminating foil L1 and the substrate foil L0 are pressed together by press-rolls 50, 51 and pulled through a fifth and a sixth pair of S-wrap rolls 54, 55 and 56, 57 respectively, of which roll 56 is driven by a motor (not shown). Subsequently the substrate foil L0 and the laminating foil L1 attached thereon are rolled on a storage roll 64. The rolls 54-57 form a facility for transporting the laminated foil by friction. The laminating foil L1 and the substrate foil L0 are allowed to move freely relatively to each other until attaching by the press rolls 50, 51.

The apparatus according to the invention comprises a facility for applying weakened portions in the laminating foil L1. The facility comprises a laser 82 controlled by a controller 84. The controller 84 controls an intensity of the laser 82 as well as a position of the laser in a direction transverse to the longitudinal direction. Additionally the controller 84 may control a position of the laser 82 in the longitudinal direction. Alternatively a mechanical punching machine may be used as facility for applying weakened portions. However, applying the weakened portions by a laser or other source of concentrated radiation has the advantage that the laminating foil L1 can move continuously.

In again another embodiment of the method the foil L1 is locally heated to above glass-transition temperature.

A combination of heating and structuring the material may be used. In this way the areas to be heated are minimized.

As shown in FIG. 2 the weakened portions 100 extend in a direction transverse Dtr to a longitudinal direction Dlong of the laminating foil L1. The weakened portions 100 as spaced at intervals along the longitudinal direction, and have a width w substantially smaller than the length $\Delta$ of said intervals. Within each interval the laminating foil L1 has a plurality of functional areas 110. By attaching a plurality of foils L1, L2 etc together the functional areas attached upon each other form for example an electronic circuit.

Referring again to FIG. 1, the S-wrap rolls 34, 35, 36, 37 in the apparatus according to the invention form a facility for providing a tension to the laminating foil L1 in the longitudinal direction. The tension applied to the laminating foil L1 causes a stretching of the laminating foil L1 in the weakened portions. The press rolls 50, 51 form a facility to attach the stretched laminating foil L1 to the substrate foil L0. After the foils L0, L1 are pressed together, the glue applied between them is hardened by UV-radiation from a curing unit 53. Alternatively, at least one of the substrate foil L0 and the laminate foil L1 may be a self gluing foil. In that case a glue suspension unit 15 and a curing unit 53 are superfluous.

In the embodiment shown, a longitudinal position of the laminating foil L1 is measured and the tension applied in the longitudinal direction is dependent on a deviation between said position and a desired position. In the embodiment shown the position is measured by cameras 86, 87 that provide an input signal for a controller 88 that controls an amount of tension applied to the laminating foil L1 by the S-rolls in particular by control of the motors for driving rolls 34, and 56. Camera 86 measures a lateral position of the foil L1 and cameras 87 measure a difference in the longitudinal position of the laminating foil L1 and the substrate foil L0. In addition the controller may control a tension in the substrate foil L0 by control of the motor that drives roll 17. The relative position in the laminating foil L1 is measured using markings on the laminating foil L1 and on the substrate foil L0. The markings are provided with a high contrast so as to facilitate detection by the camera 86. In addition the speed of the laminated foil is measured with sensor rolls 60, 61.

A more detailed view of the weakened portions is shown in FIGS. 2A, 2B and 2C. In FIGS. 2A and 2B the weakened portions in the laminating foil L1 are formed by perforations 102 in the foil. In FIG. 2A the perforations are transversely arranged rectangular areas. In FIG. 2B square perforations are applied at an angle of 45° relative to the longitudinal direction. In the embodiments shown in FIGS. 2A, 2B the perforations are applied as at least a first 104 and a second series of perforations 106 applied in the direction transverse to the longitudinal direction, and wherein the second series 106 is transversely displaced relative the first series 104. FIG. 2C shows according to enlarged cross-section IIC-IIC a portion of the foil L1 in a different embodiment. Therein the weakened portions 100 are applied as grooves 108 on both sides of the foil L1. Longitudinally between subsequent grooves 108 on one side of the foil L1 a groove 108 on the opposite foil is arranged.

It is not necessary that material is removed from the foil L1. Alternatively the foil may be provided with incisions as shown in FIG. 2D.

Figure 3:
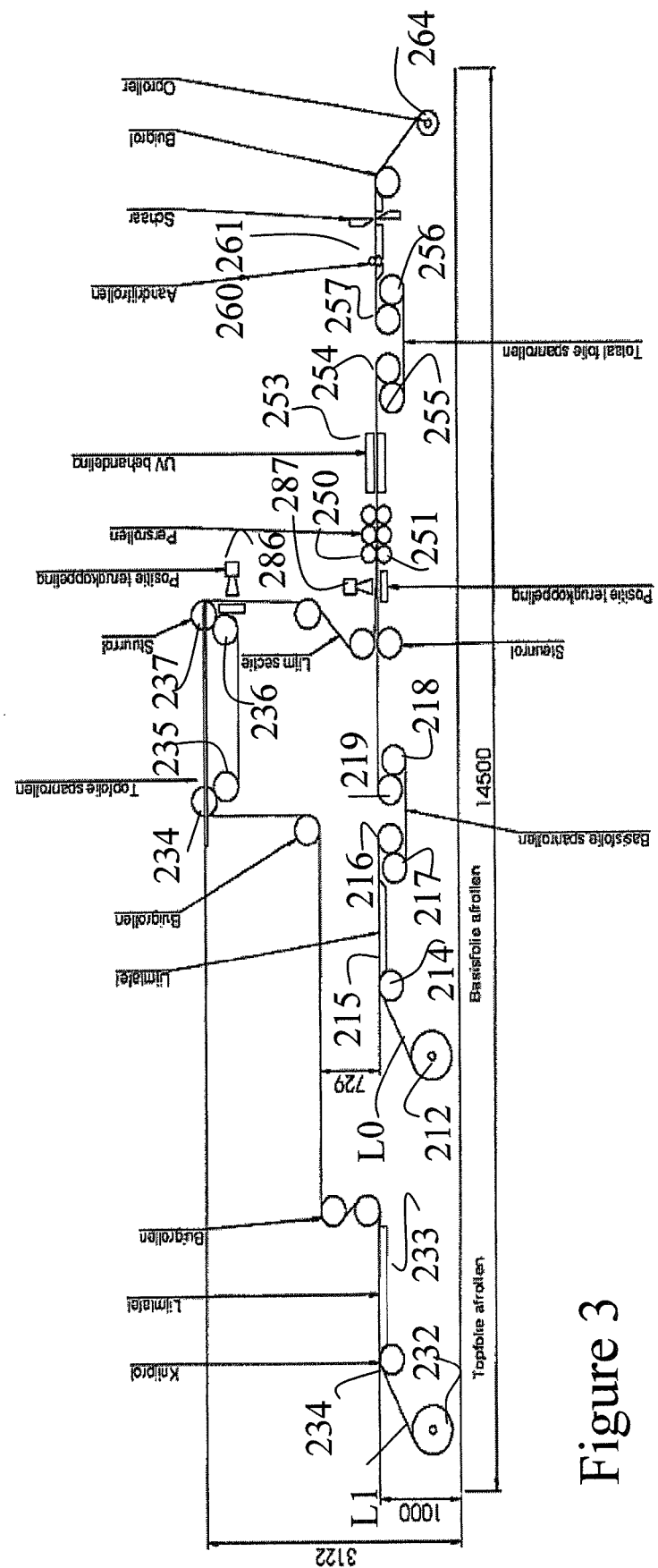

FIG. 3 shows a second device for carrying out a method according to the invention. Parts therein corresponding to those in FIG. 1 have a reference number that is 200 higher. The device shown in FIG. 3 does not have a facility for applying weakened portions in the laminating foil L1. Instead a roll 232 wherein the weakened portions are already formed by a separate facility is applied in the apparatus. In the embodiment shown, a glue dispensing unit 215 is arranged between roll 219 and press rolls 250 and 251. The glue may be provided with conductive particles, e.g. having a size of 1-10 µm and in a percentage of e.g. 15-25 vol. % to facilitate conduction between corresponding contact points in mutually neighboring foils. The foils L0 and L1 are pressed against each other by pressing rolls 250, 251 and the glue between them is hardened by radiation from a UV-radiator 253.

Suitable materials for the substrate foil L0, the laminating foil L1 and possible further foils are polyethylenes, such as polyethylene terephthalate (PET) and polyethylene naphthalate (PEN) and polyimides such as KAPTON® for example.

In the embodiment shown in FIG. 3 the apparatus has a second camera 287. Here a control system coupled to the second camera 286 provides for a prediction and approximate control of the position of the laminating foil L1. A control system coupled to the second camera 287 provides for a fine positioning of the laminating foil L1.

Figure 4:
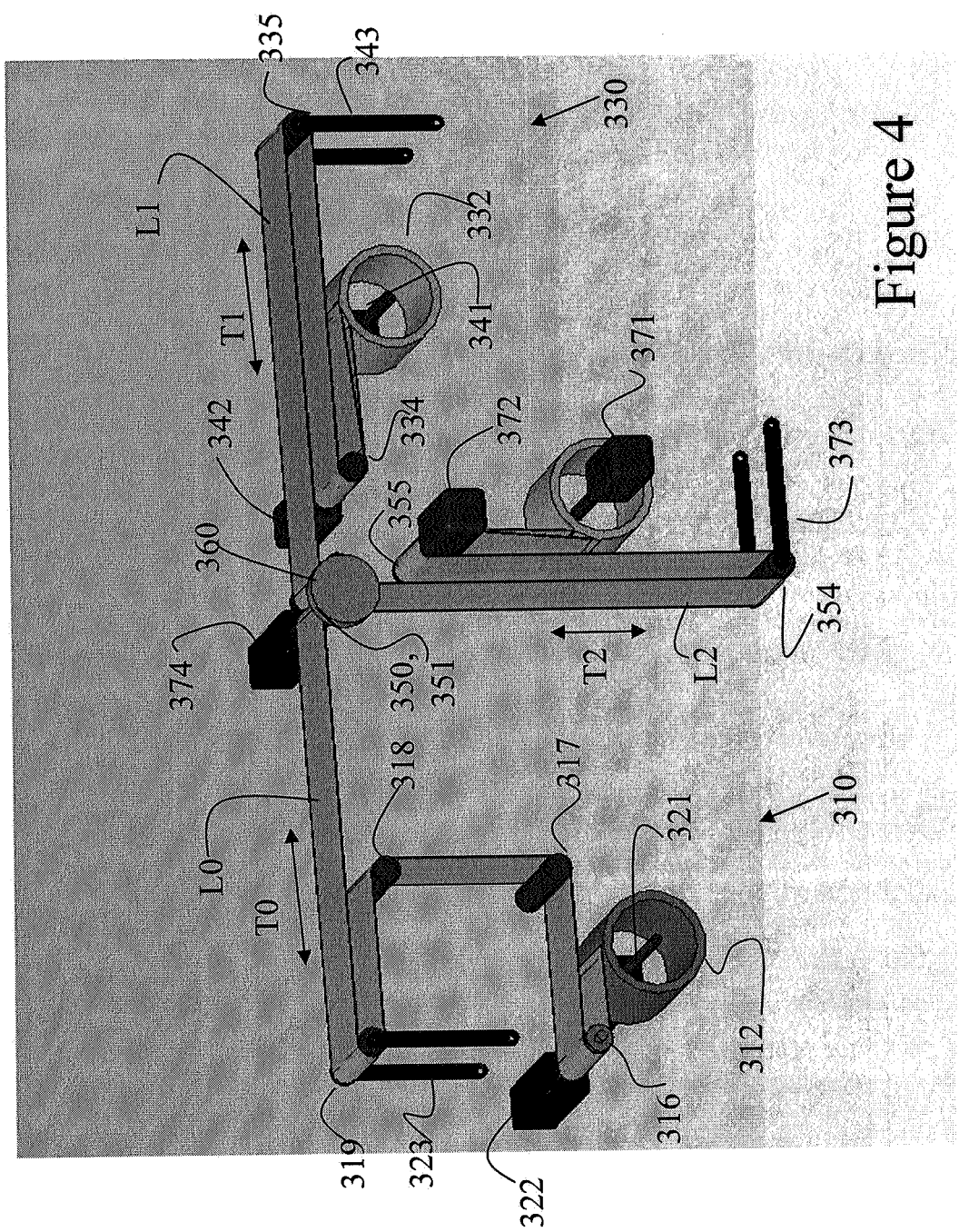
FIG. 4 shows in a perspective view a third embodiment of an apparatus according to the invention.

FIG. 4 shows in a perspective view a third embodiment of an apparatus according to the invention. Parts therein corresponding to those of FIG. 3 have a reference number that is 100 higher. In the embodiment shown in FIG. 4, the apparatus further comprises a control facility for controlling a longitudinal tension in the laminated foil depending on a longitudinal tension in the substrate foil and in the laminating foil. The tension T0 in the substrate foil L0 is measured by a tension sensor 323 and the tension T0 is controlled by control of the motor 322 for driving roll 316. The tension T1 of the laminating foil L1 is measured by a tension sensor 343 and the tension T1 is controlled by control of the motor 342 for driving roll 334. The tension T3 in the laminated foil L2 is measured by tension sensor 373 and is controlled by control of the motor 372 for driving roll 355.

Due to the process of aligning the laminating foil L1 with respect to the substrate foil L0, the tension T0 in the substrate foil L0 and the tension T1 in the laminating foil may vary.

In order to promote a homogeneous curing of the adhesive and to have low residual stresses between the substrate foil L0 and the laminating foil L1, the tension T2 in the laminated foil L2 is preferably maintained at a value substantially equal to the average value of the tensions T0, T1 in the substrate foil L0 and the laminating foil L1.

Figure 5:
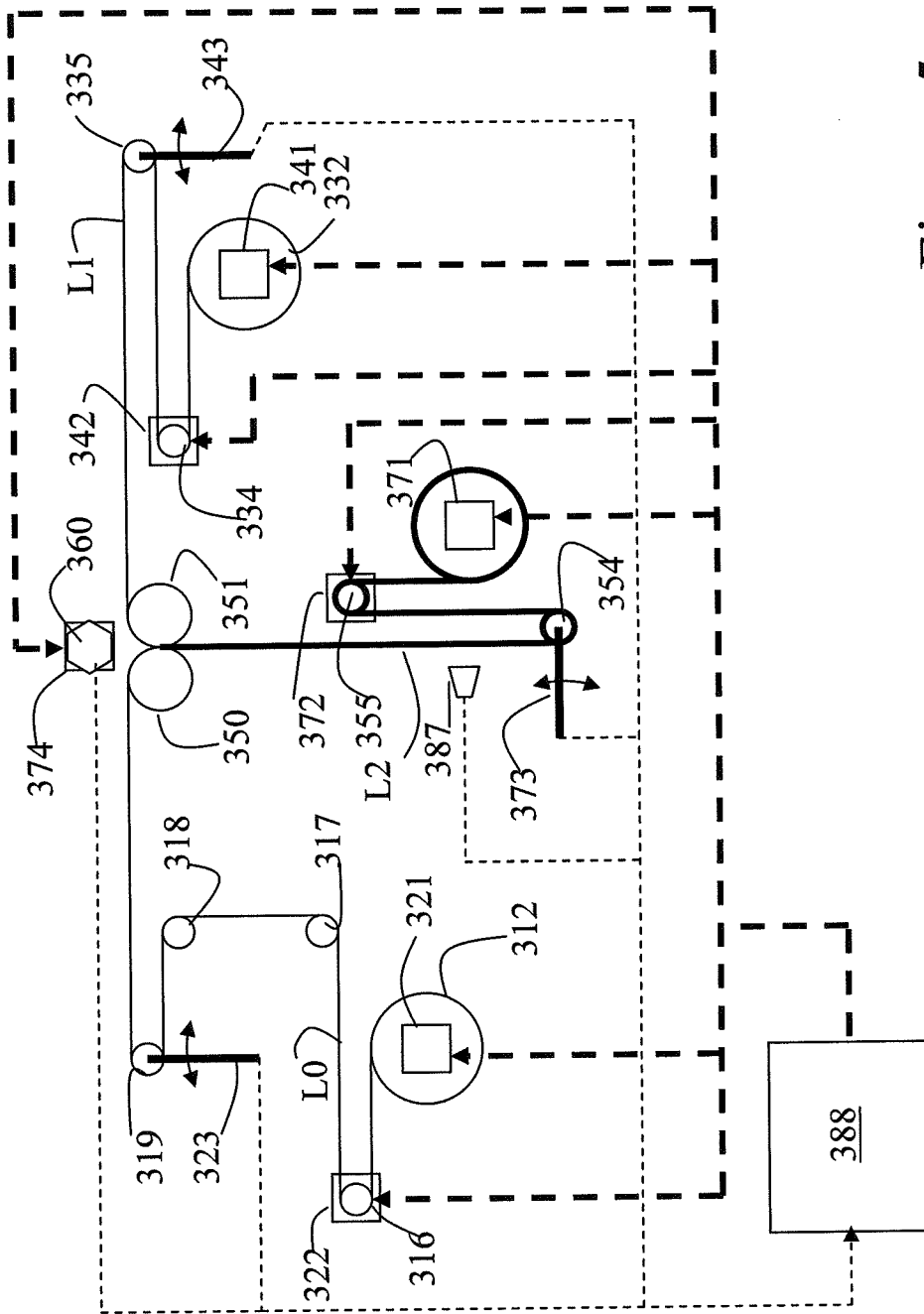
FIG. 5 shows a schematic view of the apparatus according to the third embodiment as well as a control facility therefore.

FIG. 5 shows a schematic view of the apparatus according to the third embodiment, as well as a control facility therefore. Parts therein corresponding to those in FIG. 4 have the same reference numerals. The apparatus in FIG. 5 includes a controller 388 that receives input signals (indicated by thin broken lines) from the velocity sensor 360, and the tension sensors 323, 343 and 354 for sensing a value T0, T1, T2 of the tension in the substrate foil L0, the laminating foil L1 and the laminated foil L2 respectively. The controller 388 provides control signals (indicated by thick broken lines) to the motors 321, 322, 341, 342, 371, 372 and 374. Therewith the press rolls 350, 351 are controlled at a constant speed.

Figure 6:
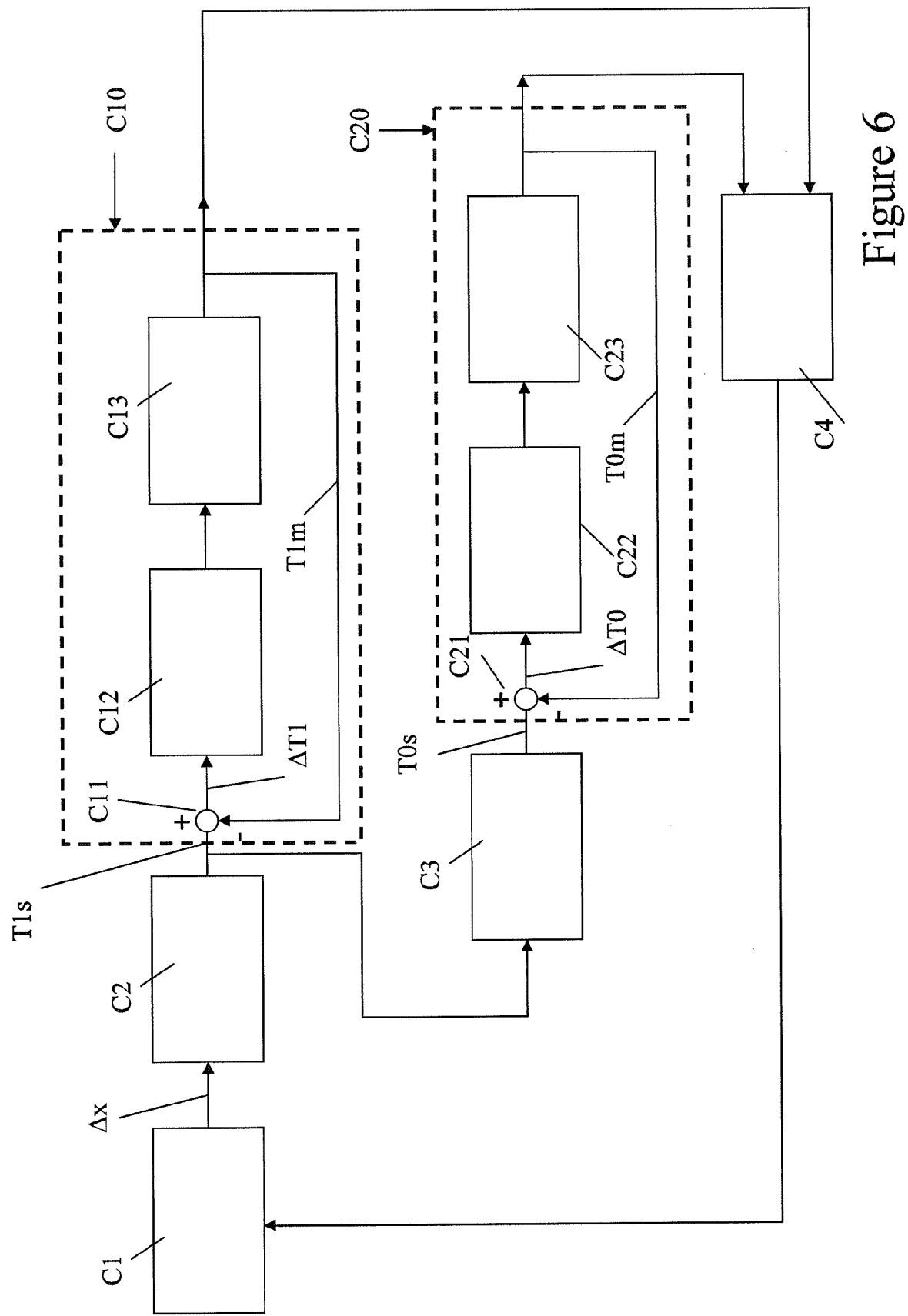
FIG. 6 shows in more detail a control facility for use in an embodiment of an apparatus according to the present invention.

FIG. 6 shows in more detail how the tension in the T0 in the substrate foil L0 and the tension T1 in the laminating foil is controlled.

In a facility C1 for measurement of an alignment error a difference Δx in the alignment between the substrate foil L0 and the laminating foil L1 is measured. The facility C1 comprises for example the pair of cameras 87 in FIG. 1.

A facility C2 is arranged for calculating a setpoint T0s for a required tension to correct the alignment error.

The setpoint T0s is provided to a control loop C10 for controlling a tension in the laminating foil L1. The control loop C10 comprises a subtraction element C11 for calculating a difference ΔT1 between a required tension T0s in the laminating foil L1 and a momentaneous tension T1m. The momentaneous tension T1m may be measured with a tension sensor, but may otherwise be estimated.

The signal representing the difference ΔT1 is applied to a controller that controls an motor that changes the tension T1m in the laminating foil L1. The actual change in tension is determined by the mechanical behaviour of the laminating foil L1 and the transport elements mechanically coupled to the motor, either directly or indirectly via the laminating foil L1. This mechanical behaviour is represented by block C13.

The setpoint for the tension T1s is further provided to a control element C3, that calculates a required tension T0s in the substrate foil L0. The signal representing the required tension T0s is provided to a control loop C20 for controlling tension in the substrate foil.

The control loop C20 comprises a subtraction element C21 for calculating a difference ΔT0 between the required tension T0s in the substrate foil L0 and a momentaneous tension T0m. A signal representing this difference ΔT0 is provided to a controller C22 for controlling an motor that changes the tension T0m in the substrate foil L0. Preferably the tension T0m is maintained at the same value as the tension T1m. In this way a warping of the laminated foil is prevented. The actual change in tension of the substrate foil L0 is determined by the mechanical behaviour of the substrate foil L0 and the transport elements mechanically coupled to the motor, either directly or indirectly via the substrate foil L0. This mechanical behaviour is represented by block C23. Finally block C4 represents the process of laminating the substrate foil L0 with the laminating foil L1 resulting in the laminated foil L1 for which the relative position between the substrate foil L0 and the laminating foil L1 is measured.

The tension in each of the foils L0, L1, may be controlled at various positions. In an embodiment the motor for controlling the tension in the laminating foil L1 is present in the supply roll, e.g. the supply roll 32. This has the advantage that a single motor can be used for controlling the unwinding of the supply roll and for maintaining the tension of the foil. The same argument applies in favour for controlling the tension in the substrate foil L0 by an motor that controls the unwinding substrate foil. A disadvantage thereof is however that the relation between the tension in the substrate or laminating foil L0, L1 and the torque applied at the supply roll depends on the amount of foil remaining at the supply roll. Preferably therefore the tension of the laminating foil is controlled by an motor that is mechanically coupled to an intermediate roll guiding the laminating foil from the supply roll to the facility for attaching the stretched laminating foil L1 to the substrate foil L0. In this case there is a fixed relation between the torque applied to the intermediate roll. More than one intermediate roll may be present in the trajectory between the supply roll and the facility for attaching. In that case the motor is preferably directly coupled to the intermediate roll that is nearest the facility for attaching in said trajectory. Analogous arguments apply to the arrangement for an motor for controlling the tension in the substrate foil. An additional motor may be applied for applying a pretension to the supply roll. In this case the motor that controls the intermediate roll can be a relative small motor that is capable of a rapid response. The tension in the foil may be measured by a tension sensor, for example the sensor 323 used for measuring the tension T0 in the substrate foil L0 in the embodiment of FIG. 4, and the sensor 343 used for measuring the tension T1 in the laminating foil L1 in the embodiment of FIG. 4. The tension sensor 323 measures the sum of the tension in the web of L0 between rolls 318 and 319, and the tension in the web of L0 between rolls 319 and 350. Likewise, the tension sensor 343 measures the sum of the tension in the web of L1 between rolls 334 and 335, and the tension in the web of L1 between rolls 335 and 351.

Alternatively the tension in L0 may be determined indirectly by measuring the rotational position of a roll used in the facility for attaching the foils and a roll that guides a foil to the facility for attaching. For example the difference in rotational position of roll 37 and the press roll 50 in FIG. 1, or the difference in rotational position of roll 319 and the press roll 350 in FIG. 1. The difference in rotational position between these rolls 37 and 50, for example, indicates the amount of strain of the web between those rolls. From this amount of strain and the mechanical properties of the web, the tension of the web can be estimated. This method has the advantage that the tension can be estimated with relatively cheap means. Only an encoder arranged at each of the rolls between which the tension of the web is to be measured suffices. When estimating the tension in this way it should be taken care that slip between the web and the relevant rolls is prevented, to promote an accurate measurement.

It is alternatively possible to omit a tension measurement or estimation entirely. In this case an open loop control is used for controlling the motor for controlling the tension in the web, using knowledge of the motor characteristic and using knowledge of the mechanical behaviour of the foil L0 and/or L1 to determine the extent to which the foil is stretched. This method still involves the feedback control using the measurement of the relative position of the laminating foil with respect to the substrate foil in the laminated foil. It is advantageous of this method that no sensors at all are required in the separate trajectories for the foils L0, L1 in the trajectories between their supply and the lamination facility.

Figure 7:
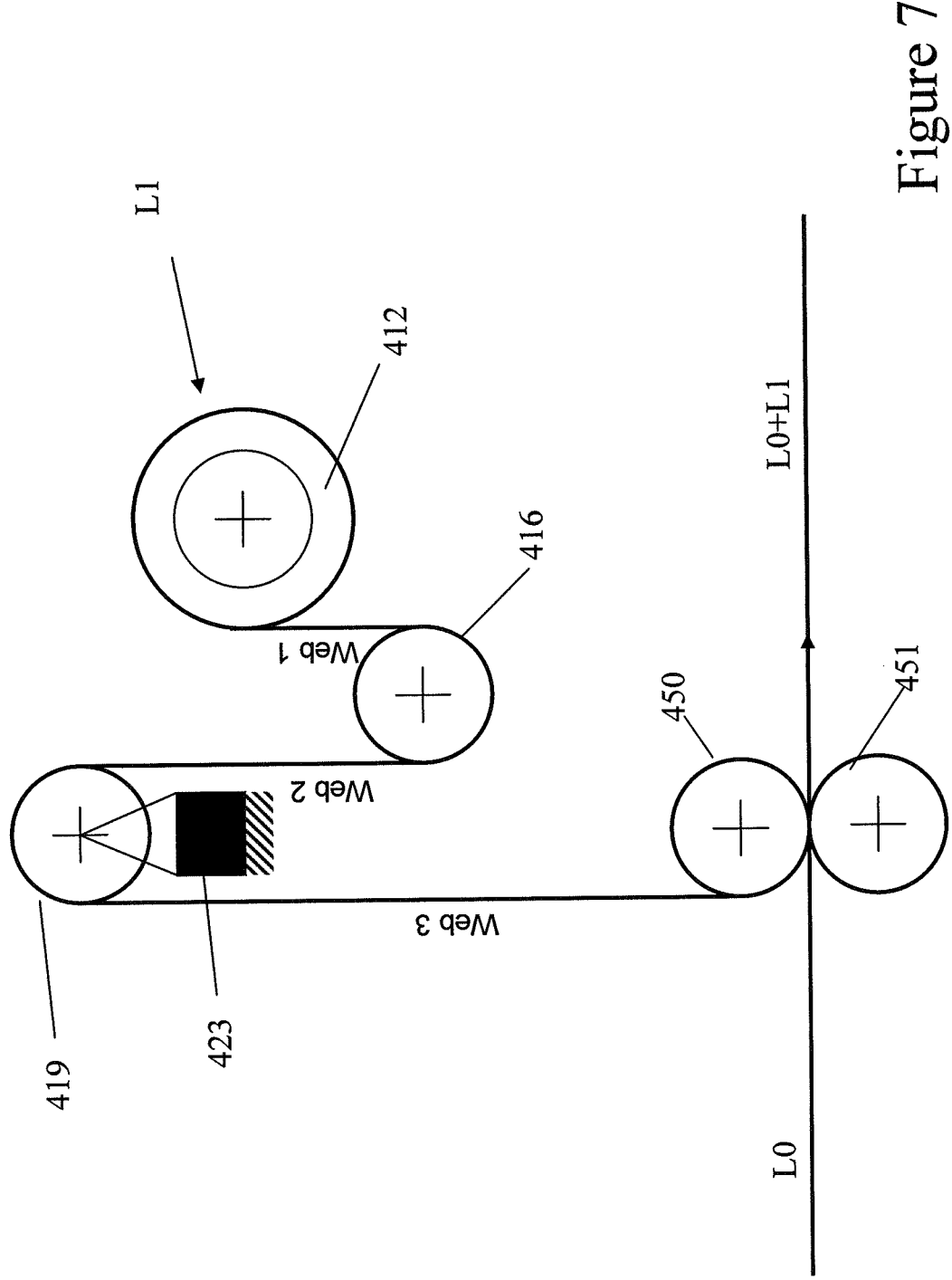
FIG. 7 shows a model used for simulation of various embodiments of the present invention.
Figure 8:
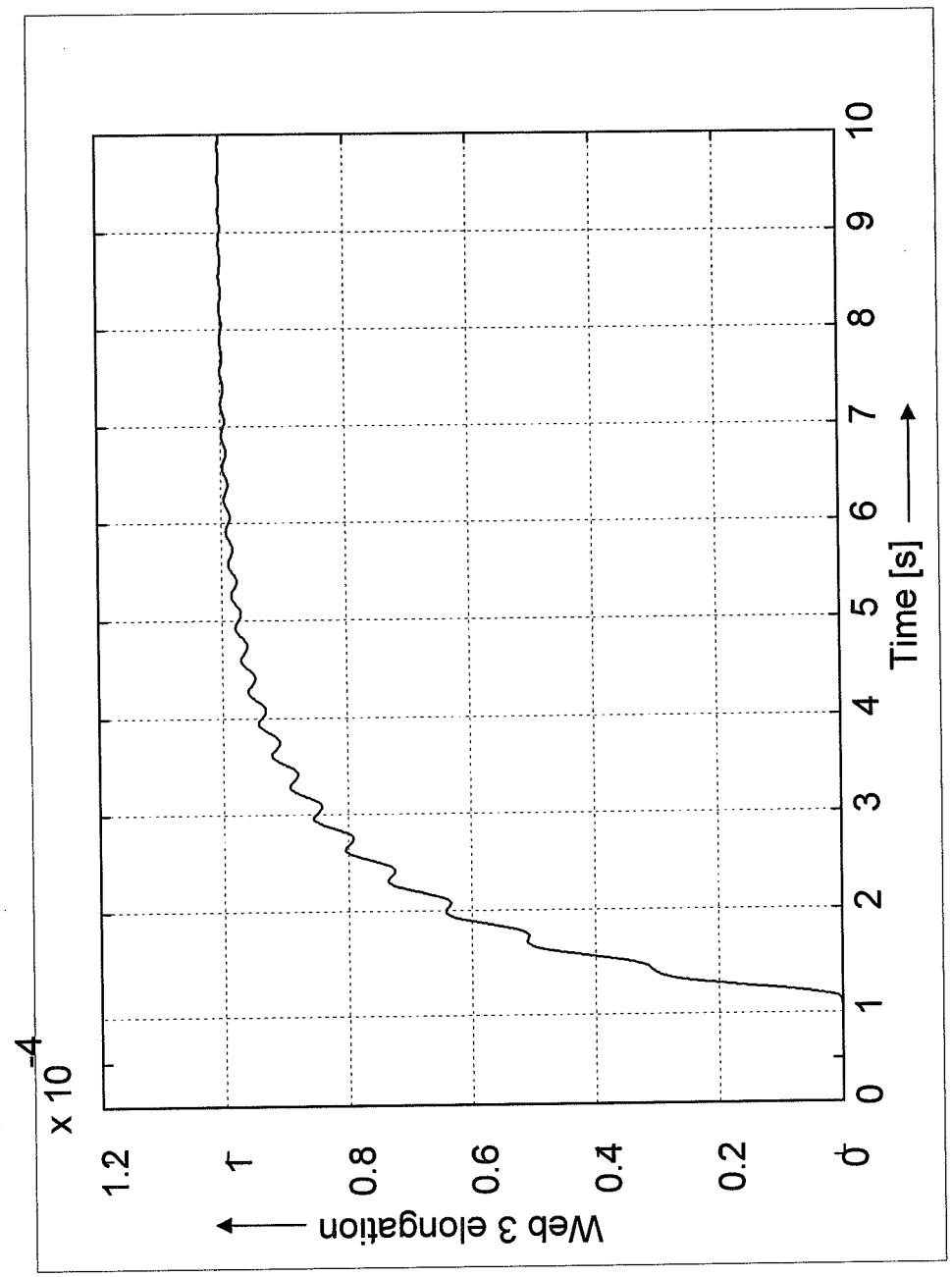
FIG. 8 shows a result of a first simulation.
Figure 9:
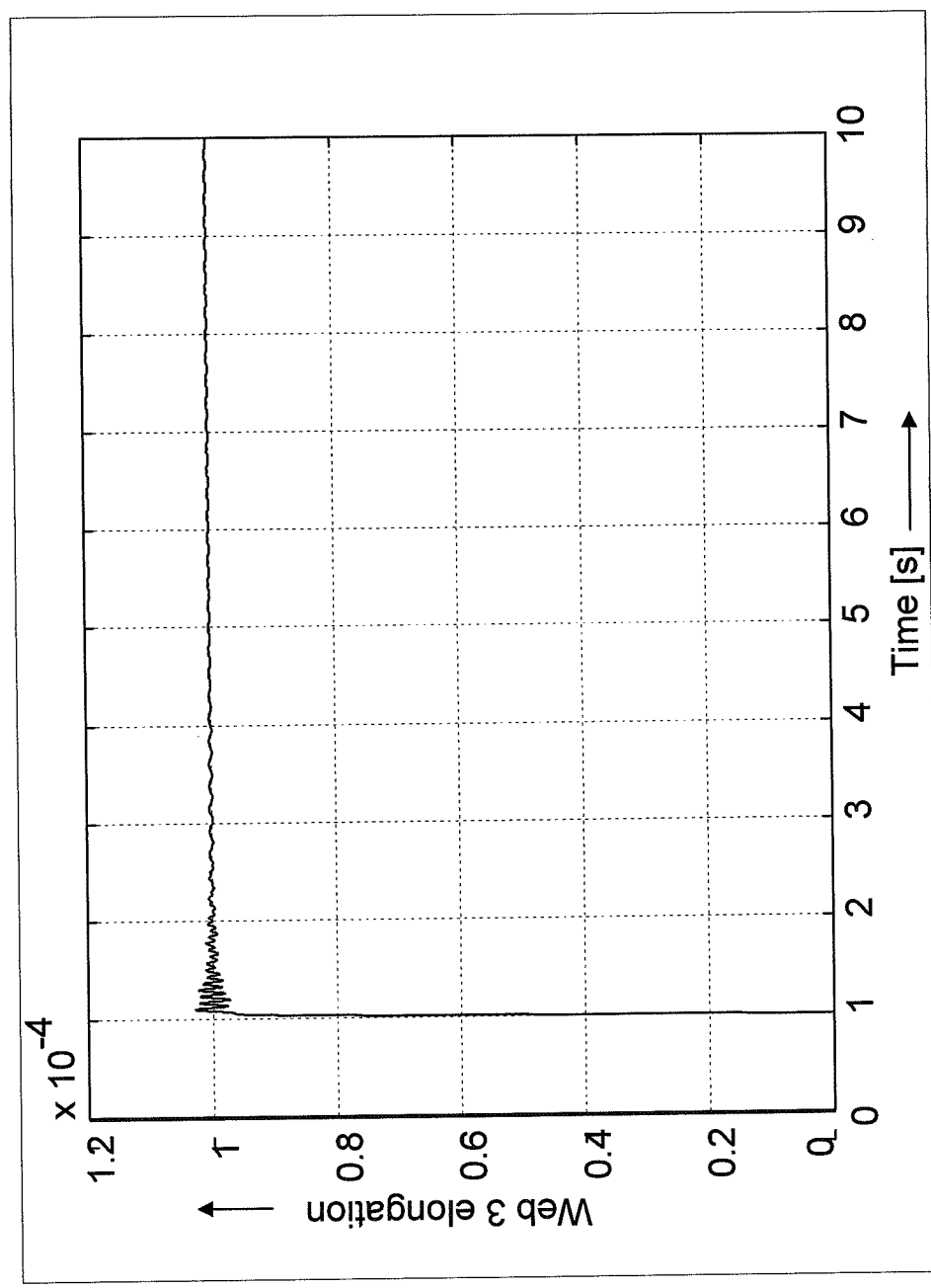
FIG. 9 shows a result of a second simulation.
Figure 10:
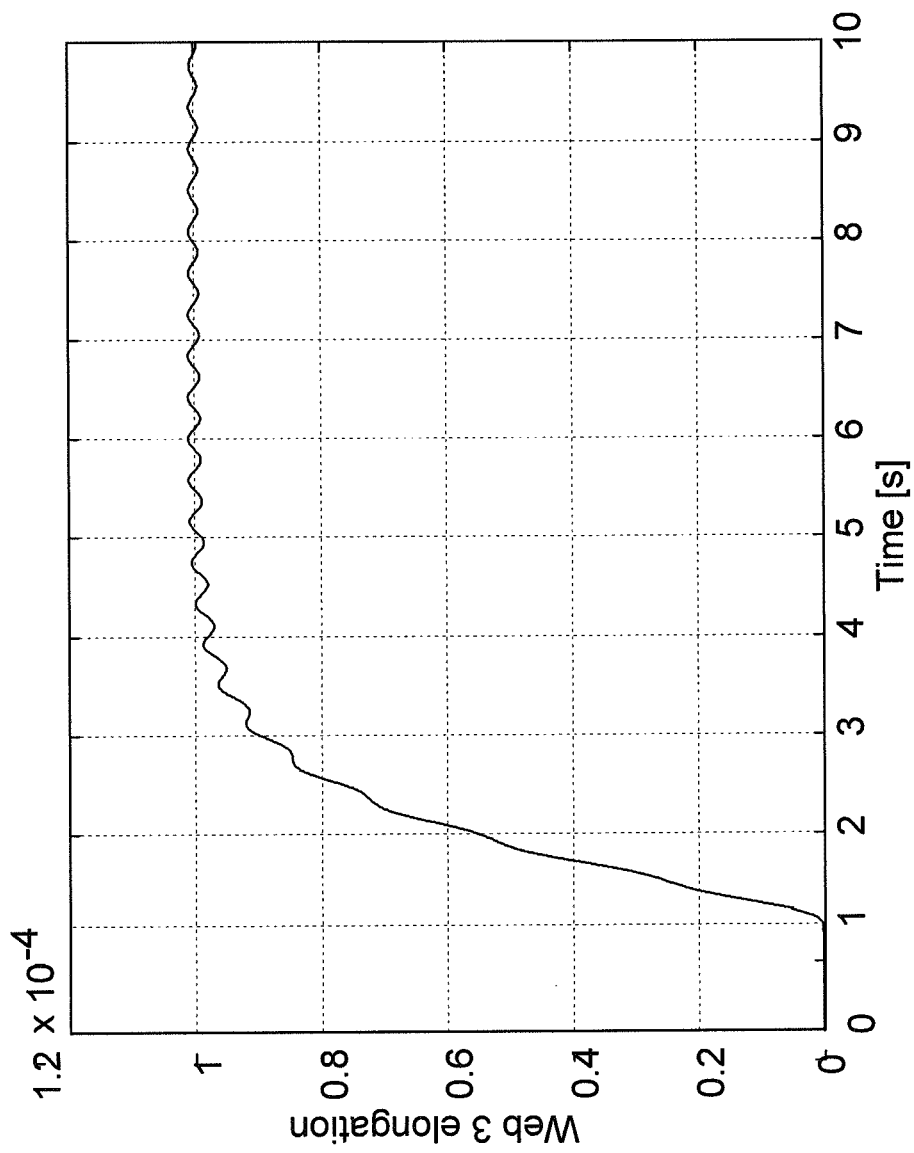
FIG. 10 shows a result of a third simulation, FIG. 11 schematically illustrates an end product comprising a stack of foils manufactured by a method according to the invention, FIG. 12 schematically illustrates a method according to the invention

Three simulations were carried out for an arrangement as shown in FIG. 7, comprising a supply roll 412 for supplying a laminating foil L1, a first intermediate roll 416 a second intermediate roll 419 and a pair of lamination rolls 450, 451 for laminating the laminating foil L1 at the substrate foil L0. By simulation the correction time necessary to correct a deviation of 100 μm between the foils by changing the tension in the laminating foil L1 was estimated. FIGS. 8, 9 and 10 respectively show the elongation as a function of time of the web of the laminating foil that is provided to the attaching facility. In a first simulation, of which a result is illustrated in FIG. 8, the motor for controlling the tension in web3 of laminating foil L1 was considered to drive the supply roll 412 and a measurement of the tension of the laminating foil L0 using a tension sensor 423 coupled to intermediate roll 419 was considered to be included. It was found that in this case the lowest eigen-frequency of the mechanical system formed by the laminating foil L1 and the rolls 412, 416 and 419 was about 2.4 Hz. This limits the controller reaction time to about 5 seconds. The torque increase required to stretch the laminating foil L1 sufficiently to compensate for the deviation has to be applied gradually to avoid oscillations.

In a second simulation, as in the first simulation, a measurement of the tension of the laminating foil L0 using a tension sensor 423 coupled to intermediate roll 419 was considered to be included. However, in the second simulation the motor for controlling the tension in web3 of laminating foil L1 was considered to drive the intermediate roll 419, which is the intermediate roll that is nearest the facility for attaching the foils L0, L1. As can be seen in FIG. 9, in this arrangement the alignment error of 100 μm between the foils can be compensated in approximately 0.1 s.

In a third simulation a measurement of the tension of the laminating foil L0 was considered absent. In this case the controller C10 of the motor coupled to the intermediate roll 419 is an open loop controller. Only the global feedback is based on the measurement of the position difference between the laminating foil L1 and the substrate foil L0 in the laminated foil L2 is present. As is clear from FIG. 10, also in this case the response time for correcting the deviation in the relative position of the foil is relatively large, here about 4 seconds, in order to prevent oscillations.

Figure 11:
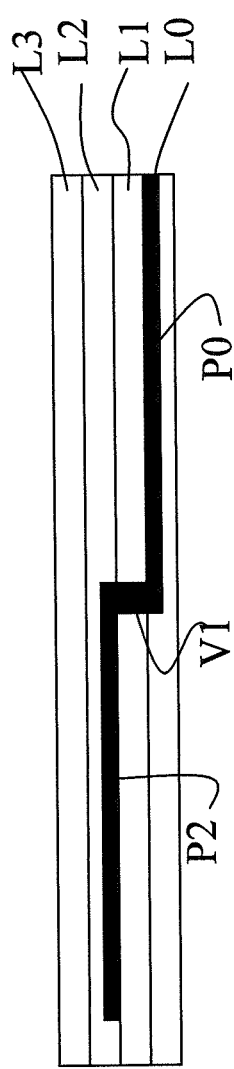

Accordingly, preferably the laminating apparatus comprises a facility for measuring a tension in the laminating foil that provides an input signal to a control system for controlling the motor for controlling the tension of the laminating foil, FIG. 11 shows by way of example a part of an electronic circuit manufactured by the method according to the invention. The substrate foil L0 comprises a conductive pattern P0. By the method according to the invention a laminating foil L1 is applied to the substrate foil L0, having a conductive via V1 that contacts the conductive pattern P0. In a next processing step a next laminating foil L2 is applied to this combination of the substrate foil L0 and the laminating foil L1. After application a conductive pattern P2 in this foil L2 contacts the conductive pattern P0 in the substrate foil L0 through the via V1. A product comprising an arbitrary number of foils may be manufactured in this way. Theoretically it would be possible to attach the multiplicity of foils in one processing step, but this would be more complicated, and require a more expensive apparatus.

Figure 12:
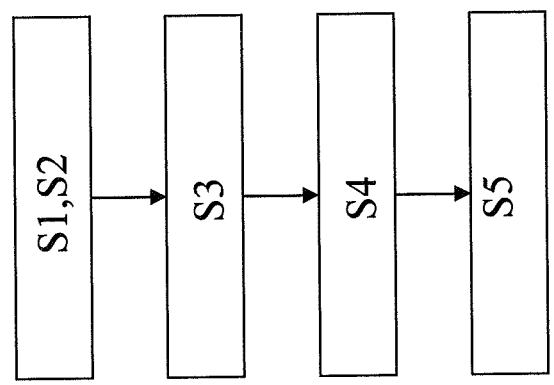

FIG. 12 schematically shows the method for providing a substrate foil with at least a laminating foil of material. The method comprises the following steps:

In steps S1, S2 the substrate foil and the laminating foil are provided respectively. These steps can be performed at the same time.

In step S3 weakened portions are applied in the laminating foil. The weakened portions are applied for example by punching, laser drilling or by chemical erosion. The applied weakened portions extend in a direction transverse to a longitudinal direction of the laminating foil. The weakened portions are spaced at intervals along the longitudinal direction, and have a width substantially smaller than the length of said intervals.

In step S4 a tension is applied to the laminating foil in the longitudinal direction. Thereby the laminating foil is stretched in the weakened portions.

The tension may be regulated by regulating a power with which the foil is pulled through the apparatus, or by regulating an amount of friction exerted on the foil upstream.

Alternatively the tension may be regulated at a constant level, while the weakening of the foil in the weakened portions is controlled so as to minimize a deviation in the position of the laminating foil relative to the substrate foil.

In step S5 the stretched laminating foil is attached to the substrate foil. For example by gluing While the invention has been illustrated and described in detail in the drawings and foregoing description, such illustration and description are to be considered illustrative and exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims the word "comprising" does not exclude other elements or steps, and the indefinite article "a" or "an" does not exclude a plurality. A single processor or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. A method for laminating a substrate foil with at least a laminating foil, the method comprising the steps of:
   providing the substrate foil;
   providing the laminating foil;
   applying weakened portions in the laminating foil, the weakened portions extending in a direction transverse to a longitudinal direction of the laminating foil, said weakened portions being spaced at intervals along the longitudinal direction, and having a width substantially smaller than a length of said intervals;
   maintaining a tension to the laminating foil in the longitudinal direction, thereby stretching the laminating foil in the weakened portions resulting in a stretched laminating foil;
   attaching the stretched laminating foil to the substrate foil, wherein the stretched laminating foil and the substrate foil are allowed to move freely relatively to each other until attaching the stretched laminating foil to the substrate foil to form a laminated foil;

aligning the laminating foil with the substrate foil by measuring a longitudinal position of the laminating foil relative to the substrate foil;

using said measurement by controlling the tension in the laminating foil dependent on said measured longitudinal position of the laminating foil relative to the substrate foil; and transporting the laminated foil by friction between the laminated foil and a transport facility while
measuring a lateral position of the laminating foil, and positioning the laminating foil relative to the substrate foil in a direction transverse to the longitudinal direction with a lateral guiding roll which is controllably displaceable in said transverse direction.

2. The method according to claim 1, wherein a tension in the substrate foil is controlled dependent on a value of a tension in the laminating foil.

3. The method according to claim 2, wherein the tension in the substrate foil is maintained at a value substantially equal to the tension in the laminating foil.

4. The method according to claim 1, wherein the laminating foil and the substrate foil are mutually aligned by applying an amount of weakening to the laminating foil dependent on a deviation between said position and a desired position relative to the substrate foil.

5. The method according to claim 1, wherein the relative position of the laminating foil is measured using markings on the foils.

6. The method according to claim 1, wherein the weakened portions in the laminating foil are applied by thermally softening the laminating foil.

7. The method according to claim 1, wherein a longitudinal tension of the laminated foil is controlled dependent on a longitudinal tension of the substrate foil and of the laminating foil.

8. The method according to claim 1, further including controlling a position of the laminating foil relative to the substrate foil in a direction transverse to the longitudinal direction.

* * * * *

UNITED STATES PATENT AND TRADEMARK OFFICE
CERTIFICATE OF CORRECTION

PATENT NO.        : 8,435,365 B2
APPLICATION NO.   : 12/667167
DATED             : May 7, 2013
INVENTOR(S)       : Ike Gerke De Vries Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this
Eighth Day of September, 2015

Michelle K. Lee
*Director of the United States Patent and Trademark Office*